No. 739,123. PATENTED SEPT. 15, 1903.
R. TRETT & C. H. ROUDYBUSH.
DRAFT EQUALIZER.
APPLICATION FILED JULY 1, 1902.
NO MODEL.
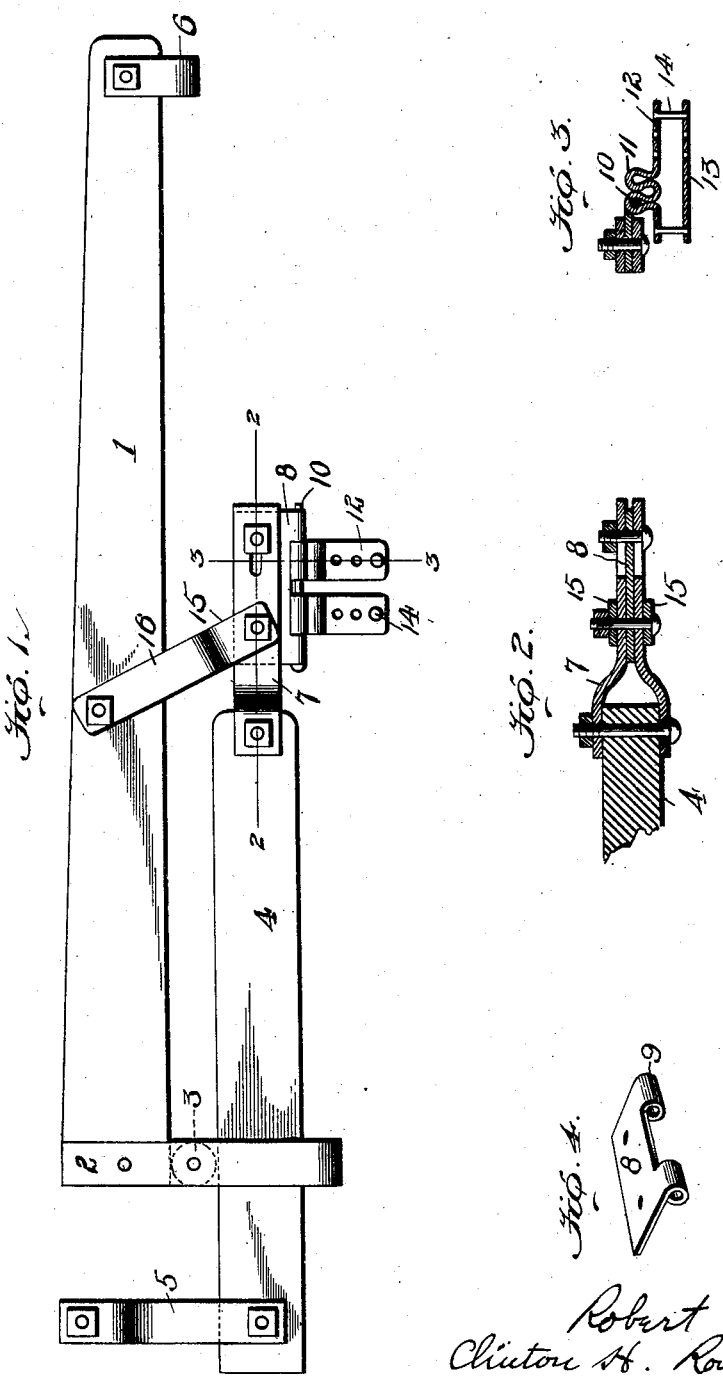

No. 739,123. Patented September 15, 1903.

UNITED STATES PATENT OFFICE.

ROBERT TRETT AND CLINTON H. ROUDYBUSH, OF WOODLAND, ILLINOIS.

DRAFT-EQUALIZER.

SPECIFICATION forming part of Letters Patent No. 739,123, dated September 15, 1903.

Application filed July 1, 1902. Serial No. 113,908. (No model.)

*To all whom it may concern:*

Be it known that we, ROBERT TRETT and CLINTON H. ROUDYBUSH, citizens of the United States, residing at Woodland, in the county of Iroquois and State of Illinois, have invented certain new and useful Improvements in Draft-Equalizers, of which the following is a specification, reference being had therein to the accompanying drawings.

Our invention relates to new and useful improvements in draft-equalizers; and its object is to provide a simple and inexpensive device of this character so constructed as to prevent side draft.

With the above and other objects in view the invention consists in providing a strip to which the beam of a plow or cultivator or other device is adapted to be attached. This strip is pivotally secured to a bar slidably mounted in a yoke extending from a second bar. A link connects said second bar and the strip of the plow-beam and a doubletree is adapted to be secured to the outer end of each bar. By arranging the bars in the manner above described the equalizer is permitted to automatically lengthen or shorten when the draft-animals move from or toward each other. In this manner all side draft is prevented and the strain is equalized at all times.

The invention also consists in the further novel construction and combination of parts hereinafter more fully described and claimed, and illustrated in the accompanying drawings, showing the preferred form of our invention, and in which—

Figure 1 is a plan view of the draft-equalizer. Fig. 2 is a section on line 2 2, Fig. 1. Fig. 3 is a section on line 3 3, Fig. 1, and Fig. 4 is a detail view of the securing-plate of the beam-clamps.

Referring to the figures by numerals of reference, 1 is a bar having a loop 2 extending from one end thereof. A roller 3 is journaled in this loop adjacent to the rear edge of bar 1 and is adapted to be contacted by a second bar 4, which is slidably mounted within and extends through the loop 2. A link 5 of suitable construction extends forward from the outer end of bar 4, while a suitable loop 6 is arranged at the outer end of bar 1. Each of these devices 5 and 6 is adapted to be attached to a doubletree. (Not shown.)

A Y-shaped strip 7 is pivoted to the inner end of bar 4 and is preferably formed of two similar sections bolted together, as shown in Fig. 2. A plate 8 is secured therebetween and is provided with rearwardly-projecting ears 9, connected by a pin 10. This pin extends through one of a pair of loops 11, formed upon the upper member 12 of a clamp, the lower member 13 of said clamp being connected to member 12 by bolts 14 or in other suitable manner. The clamp is adapted to receive the end of a plow-beam or other similar device or a horizontal clevis connected thereto. The forked end 15 of a link 16 is pivoted to the strip 7 and the opposite end of said link is pivoted to the bar 1. The distance from loop 6 to said link is equal to the distance from loop 5 to the forked end of link 16.

In operation it will be seen that when the pull upon loop 6 is greater than that upon loop 5 said loop 5 will be forced backward, and vice versa. If a horse connected to the bar 1 moves toward the side, the said bar will be moved to one side therewith. In view of this arrangement and the employment of the pivoted loop 5 the horses of a team can move from or toward each other without altering the course of the plow to which they are connected or shifting the load to one or the other.

In the foregoing description we have shown the preferred form of our invention, but we do not limit ourselves thereto, as we are aware that modifications may be made therein without departing from the spirit or sacrificing the advantages thereof, and we therefore reserve the right to make such changes as fairly fall within the scope of our invention.

Having thus fully described our invention, what we therefore claim as new, and desire to secure by Letters Patent, is—

1. In a draft-equalizer the combination with securing means; of a bar pivotally connected thereto, a second bar slidably connected to said bar, and a link connection between said second bar and the securing means.

2. In a draft-equalizer, the combination with securing means; of bars connected thereto, one of which is adapted to move longitudinally in relation to the other.

3. In a draft-equalizer the combination with securing means; of a bar pivotally connected thereto, a second bar, a loop extending therefrom and inclosing and slidably mounted upon the first-mentioned bar, and a link connecting the second bar and the fastening means, whereby said bars may move longitudinally in opposite directions.

4. In a draft-equalizer the combination with a strip having a clamp hinged thereto; of a bar pivoted to said strip, a second bar, a loop extending from said second bar and inclosing and slidably mounted upon the first-mentioned bar, a friction-roller within the loop, and a link connecting the second bar to the strip.

In testimony whereof we affix our signatures in presence of two witnesses.

ROBERT TRETT.
CLINTON H. ROUDYBUSH.

Witnesses:
GEO. M. WILLIAMS,
SAMUEL JOHN.